US012530364B2

(12) United States Patent
Nätlitz et al.

(10) Patent No.: US 12,530,364 B2
(45) Date of Patent: Jan. 20, 2026

(54) ADAPTABLE DATA WAREHOUSING COMPUTING SYSTEMS AND METHODS CONFIGURED FOR PROGRAMMATIC MODELING AND DATABASE BUILDING

(71) Applicant: EXASOL AG, Nuremberg (DE)

(72) Inventors: Marco Albert Nätlitz, Cologne (DE); Reinhard Alfons Mense, Cologne (DE)

(73) Assignee: EXASOL AG, Nuremberg (DE)

( * ) Notice: Subject to any disclaimer, the term of this patent is extended or adjusted under 35 U.S.C. 154(b) by 117 days.

(21) Appl. No.: 18/411,367

(22) Filed: Jan. 12, 2024

(65) Prior Publication Data
US 2025/0231955 A1    Jul. 17, 2025

(51) Int. Cl.
*G06F 16/27* (2019.01)
*G06F 16/21* (2019.01)
*G06F 16/25* (2019.01)

(52) U.S. Cl.
CPC .......... *G06F 16/254* (2019.01); *G06F 16/212* (2019.01); *G06F 16/258* (2019.01); *G06F 16/27* (2019.01)

(58) Field of Classification Search
None
See application file for complete search history.

(56) References Cited

U.S. PATENT DOCUMENTS

| | | | |
|---|---|---|---|
| 2003/0222906 A1* | 12/2003 | Fish | G06F 16/212 715/744 |
| 2010/0082646 A1* | 4/2010 | Meek | G06F 16/252 707/752 |
| 2010/0088154 A1* | 4/2010 | Vailaya | G06F 16/212 705/7.29 |
| 2011/0295794 A1* | 12/2011 | Venkatasubramanian | G06F 16/283 707/602 |
| 2021/0064355 A1* | 3/2021 | Martinsson | G06F 16/256 |
| 2021/0304118 A1* | 9/2021 | Durairaj | G06F 16/958 |
| 2023/0067944 A1* | 3/2023 | Ares | G06F 16/26 |
| 2024/0037506 A1* | 2/2024 | Doley | G06F 16/254 |
| 2024/0134889 A1* | 4/2024 | Moncivais-Pinedo | G06F 16/2462 |

* cited by examiner

*Primary Examiner* — Son T Hoang
(74) *Attorney, Agent, or Firm* — Marshall, Gerstein & Borun LLP

(57) ABSTRACT

Adaptable data warehousing computing systems and methods are disclosed for improved and flexible declarative control for programmatic modeling and database building, including in compute intense environments. A declarative scripting engine executes computing commands defined in a domain specific language (DSL), which is configured to programmatically configure a conceptual data model defining business object(s). A logical data model may be generated based on a declarative command defining the conceptual data model. A physical data model may be generated based on the logical data model, where the physical data model defines stage, core layer, and/or a data mart layers that may be deployed to a target database or data warehouse, and where the stage, core layer, and/or a data mart layers are the same or similar to those of the logical data model.

23 Claims, 9 Drawing Sheets

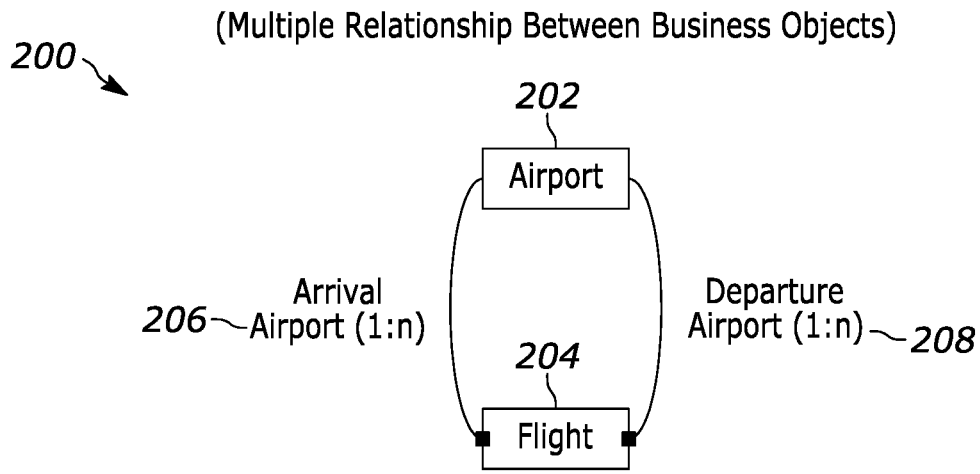

FIG. 2

(DSL To Define A Source With Business Object)

```
DEFINE SOURCE "Sales"."CUSTOMER" LOCATION "CUSTOMER" (
  "BIRTH_DATE " [DATE] AS "Birth Date" ("Customer") ,
  "CITY" [VARCHAR] (100) AS "City" ("Customer") ,
  "COUNTRY_ISO_CODE" [VARCHAR] (3) AS "Country ISO Code" ("Customer") ,
  "CUSTOMER_NR" [VARCHAR] (10) AS "Customer Number" IS KEY ("Customer") ,
  "FIRST_NAME" [VARCHAR] (100) AS "First Name" ("Customer") ,
  "LAST_NAME" [VARCHAR] (100) AS "Last Name" ("Customer") ,
  "STATE" [VARCHAR] (50) AS "State" ("Customer") ,
  "STATE_CODE" [VARCHAR] (5) AS "State Code" ("Customer") ,
  "STREET_NAME" [VARCHAR] (100) AS "Street Name" ("Customer") ,
  "STREET_NUMBER" [VARCHAR] (100) AS "Street Number" ("Customer") ,
  "ZIP_CODE" [VARCHAR] (20) AS "Zip Code" ("Customer")
)
;
```

FIG. 3

400 ⟶            (DSL To Alter A Source)

```
        ALTER SOURCE "Sales"."CUSTOMER"
402 ⟶   ADD COLUMN "GENDER" [VARCHAR] (1) AS "GENDER" ("Customer")
        ;

Alter Source "Sales"."CUSTOMER"
404 ⟶   DROP COLUMN "GENDER"
        ;

Alter SOURCE "Sales"."CUSTOMER"
406 ⟶   MODIFY COLUMN "GENDER" [VARCHAR] (10)
        ;
```

(DSL To Define Relationships Between Business Objects)

```
DEFINE BUSINESS REFERENCE "Flight"."Departure Airport" ("Departure Airport Code")
REFERENCES "Airport" ("Airport Code") ⟶ 502
;

DEFINE BUSINESS REFERENCE "Flight"."Arrival Airport" ("Arrival Airport Code")
REFERENCES "Airport" ("Airport Code") ⟶ 504
;
```

FIG. 5

600 ⟶ (DSL To Define A Calculated Attributes)

602 ⟶ DEFINE CALCULATED ATTRIBUTE "Amount in Cash"
    IS "case
        when 'Sale' . 'Cash Or Plastic' = 'C'
        then 'Sale' . 'Quantity' * 'Sale Product' . 'Gross Price'
        end"
    ;

FIG. 6

ADAPTABLE DATA WAREHOUSING COMPUTING SYSTEMS AND METHODS CONFIGURED FOR PROGRAMMATIC MODELING AND DATABASE BUILDING

FIELD

The present disclosure generally relates to adaptable data warehousing computing systems methods, and more particularly to, adaptable data warehousing computing systems and methods for programmatic modeling and database building.

BACKGROUND

Database development typically requires various computational and design complexities. In addition, data retrieval, analysis, and review of data from proprietary databases can be difficult, where it can be difficult to formulate database queries to address data needs or to generate graphical insights into the data. For example, development of data products for evaluating and analyzing data can be either central solutions in the form of a data warehouse or decentralized data products that cover specific departments of a given company. In both cases, data from various sources is prepared in such a way that it can be evaluated. However, the following challenges typically arise in this context. First, challenges arise regarding integration and homogenization of the data from different sources. Second, challenges arise regarding data that is stored in a time-variant manner in the data products, resulting in large amounts of data. In addition, challenges arise regarding the development of transformations for measures, which is complex and time-consuming.

Typically, to meet these challenges a multi-layer architecture is used. A multi-layer architecture may include a stage layer that provides source data as a one-to-one copy from the sources. The multi-layer architecture may also include a core layer that attempts to provide integration, homogenization, and time-variant storage of the data, as well as transformation and storage of calculated measures. Finally, the multi-layer architecture may include a data mart layer that provides preparation of data for simple, flexible, and high-performance analysis.

But the development of the layers for data products can be technically complex. For example, for the development of data products, logical and physical data models as well as extraction, transformation and loading processes (ETL processes) must be developed for each of these layers. Such development can be inefficient not only in terms of time to develop such data products, but also in terms of the impact such development can have on underlying computing systems and related architectures and resources (e.g., memory and compute cycles). For example, for the core and data mart layers, the analysis requirements of a given database (e.g., specific to a given company) must first be manually converted into a logical data model by business intelligence (BI) experts. Data modeling methods such as Data Vault or Dimensional Modeling are typically used for this purpose. Especially the transformations for calculated measures require expert data modeling skills to extend the logical data model and to develop the required ETL processes, each of which are time extensive and compute extensive tasks.

Still further, the ETL processes for the core and data mart layers can only be partially automated with the existing solutions. While template-based automations are used for writing the data into the target table, complex joins and filters may be required for preparing the data, so that experts (ETL developers) are forced to develop the processes manually. The development of the core and data mart layers therefore require special technical know-how for data modeling and the development of ETL processes, all of which must be developed manually, and in a time and resource intensive manner, all of which is computationally intensive on underlying computing systems and databases for which the ETL processes target.

For at least these reasons a problem arises such that implementation databases, data visualization, and exploration of new analyses is a very inefficient process.

For the forgoing reasons, there is a need for adaptable data warehousing computing systems and methods for programmatic modeling and database building.

SUMMARY

As described herein the adaptable data warehousing computing systems and methods for programmatic modeling and database building provide a solution to the above referenced issues. In particular, the adaptable data warehousing computing systems and methods implement a conceptual model that is defined instead of a logical data model. A logical data model can be automatically generated from the conceptual model. In addition, the adaptable data warehousing computing systems and methods, as described herein, automatically generate a physical data model from the logical data model. Still further, adaptable data warehousing computing systems and methods can automatically generate all ETL processes, and can execute such ETL processes in the correct order based on dependencies, as defined in the conceptual data model in order to instantiate one or more databases or otherwise a data warehouse.

In addition, the adaptable data warehousing computing systems and methods described herein allow users to programmatically model and build data warehouse and/or databases via a graphical user interface (GUI) without having to rely on a software developer or engineer. For example, a user can use a GUI to build a conceptual data model for use to seed or otherwise instantiate or build further layers, e.g., the logical and physical data layers, as describe herein. For example, in some implementations, the GUI may comprise a web application (front end) in communication with a cloud-based platform (backend) that a user may access. The adaptable data warehousing computing systems and methods are disclosed for improved and flexible declarative control for programmatic modeling and database building, including in compute intense environments. A declarative scripting engine executes computing commands defined in a domain specific language (DSL) that is configured to programmatically configure a conceptual data model defining business object(s). A logical data model may be generated based on a declarative command defining the conceptual data model. A physical data model may be generated based on the logical data model, where the physical data model defines stage, core layer, and/or a data mart layers that may be deployed to a target database or a data warehouse, where the stage, core layer, and/or a data mart layers are the same or similar to those of the logical data model.

Target database(s) may include, by way of non-limiting example, an EXASOL database or data warehouse, an Amazon Web Services (AWS) database or data warehouse, or the like. The generated code may create by a code generator all needed database tables, every related table constraint, related metadata, and the like. The generator software also creates various layers of code responsible for moving, formatting, creating, or otherwise manipulating data. For example, data transformations and/or formatting are made for moving code among the various layers. In addition, specific queries can be generated that are highly efficient for accessing the database.

The code generator implements or executes a proprietary language, referred to herein as the domain specific language (DSL). DSL can be manipulated by a user, or a user can use a GUI to generate to DSL. DSL can be used to define a conceptional data model. Based on a conceptional data model, the adaptable data warehousing computing systems and methods can derive/create technical models, layouts, and/or other processes to run a device specific or hardware specific data warehouses and/or databases as implemented on specific hardware. Accordingly, the DSL provides a single solution for modeling and building data warehouses across different data warehousing platforms and/or databases, each of which may have different syntaxes, requirements, attributes, parameters, and/or otherwise configuration requirements. In various aspects, the DSL may be executed to locate business objects, extend business objects with attributes, determine what data is needed for querying a database, among various other computational tasks.

The output of the adaptable data warehousing computing systems and methods may comprise a graph and/or schema, which may be deployed to the target database(s). In addition, in various aspects the data may be used to output reports, graphics, graphs, trees, or other such information stored int the deployed database. In some aspects, the output may be JavaScript Object Notation (JSON).

In some aspects, the techniques described herein relate to an adaptable data warehousing computing system configured for programmatic modeling and database building, the adaptable data warehousing computing system including: a target database; one or more processors communicatively coupled to the target database; one or more computer memories accessible by the one or more processors; a declarative scripting engine, stored on one or more computer memories and accessible by the one or more processors, and configured to execute declarative computing commands defined by a domain specific language (DSL), wherein the DSL is modifiable to programmatically configure a conceptual data model, wherein the conceptual data model defines one or more business objects; and a generator software component including computer-executable instructions stored on one or more memories and, that, when executed by one or more processors, cause the one or more processors to: input a declarative command having a programmatic syntax in the DSL, wherein the declarative command defines one or more business objects of the conceptual data model, each business object having one or more attributes and/or defining one or more relationships between one or more other business objects; generate, based on the declarative command and a set of logical layer rules, a logical data model, the logical data model defining one or more logical layers including: a stage layer, a core layer, and/or a data mart layer; generate, based on the logical data model and one or more database-specific templates, one or more database objects; and update, based on the one or more database objects of the logical data model, the target database to define a physical data model, the physical data model defining physical data model layers derived from a same type of layer as selected from the one or more logical layers.

In some aspects, the techniques described herein relate to an adaptable data warehousing computing method for programmatic modeling and database building, the adaptable data warehousing computing method including: inputting a declarative command having a programmatic syntax in a domain specific language (DSL), wherein the DSL is configured to define one or more declarative computing commands executable by a declarative scripting engine stored on one or more computer memories and accessible by one or more processors, wherein the DSL is modifiable to programmatically configure a conceptual data model, wherein the conceptual data model defines one or more business objects, and, wherein the declarative command defines the one or more business objects of the conceptual data model, each business object having one or more attributes and/or defining one or more relationships between one or more other business objects; generating, based on the declarative command and a set of logical layer rules, a logical data model, the logical data model defining one or more logical layers including: a stage layer, a core layer, and/or a data mart layer, generate, based on the logical data model and one or more database-specific templates, one or more database objects; and updating, based on the one or more database objects of the logical data model by the one or more processors, a target database to define a physical data model, the physical data model defining physical data model layers derived from a same type of layer as selected from the one or more logical layers.

In some aspects, the techniques described herein relate to a tangible, non-transitory computer-readable medium storing instructions for optimizing search engine results, that when executed by one or more processors cause the one or more processors to: input a declarative command having a programmatic syntax in a domain specific language (DSL), wherein the DSL is configured to define one or more declarative computing commands executable by a declarative scripting engine stored on one or more computer memories and accessible by one or more processors, wherein the DSL is modifiable to programmatically configure a conceptual data model, wherein the conceptual data model defines one or more business objects, and, wherein the declarative command defines the one or more business objects of the conceptual data model, each business object having one or more attributes and/or defining one or more relationships between one or more other business objects; generate, based on the declarative command and a set of logical layer rules, a logical data model, the logical data model defining one or more logical layers including: a stage layer, a core layer, and/or a data mart layer; generate, based on the logical data model and one or more database-specific templates, one or more database objects; and update, based on the one or more database objects of the logical data model by the one or more processors, a target database to define a physical data model, the physical data model defining physical data model layers derived from a same type of layer as selected from the one or more logical layers.

The present disclosure relates to improvements to technologies or technical fields at least because the present disclosure describes or introduces improvements to computing devices in the fields of data warehousing and/or Big Data computing devices and/or environments, whereby the adaptable data warehousing computing systems and methods, as described herein, are configured for programmatic modeling and database building for executing on server(s), including on server farms and/or data warehousing environments, and improves these computing systems by introducing a declarative scripting engine and a related domain specific language (DSL) that allows for efficient configuration, error reduction, and reduction of computer resources, including processing, memory, and related data, as efficiently generated via multiple data layers and stored the memory and as processed by related processors (e.g., processors of a server, server farm, or compute cluster). For example, the domain specific language (DSL) allows for generation of a conceptual data model that can be written once and applied to a variety of differently formatted and/or configured databases, each having their own syntax and settings. For example, the conceptual data model may be used to generate logical and physical data layers that can be deployed to target databases thereby reducing the amount of processing cycles, and memory, required to configure and deploy to each of a number of different databases independently. This improves the system by creating a flexible and dynamic approach to configuring multiple databases, with the use of a single conceptual data model across multiple, different types of databases that can implement different underlying database technologies.

Still further the present disclosure relates to improvements to technologies or technical fields at least because the adaptable data warehousing computing systems and methods, as described herein, enables fully automatic generation of both the logical and physical data models for all layers of a given data product, e.g., a database having a specific configuration and/or format. Still further, because both relationships and calculated attributes of business objects are part of the conceptual model, all tables of the data models required to prepare the data for the ETL process(es) may be fully automated, and, across different database types. The complete automation of the logical and the physical data modeling, as well as all ETL processes, significantly reduces the complexity of the development of a data product, and, thus significantly shortens the development time, and also the memory and processing cycles of the database or data warehousing system, when compared to implementing a same set of data modeling using conventional database technology.

Still further, the adaptable data warehousing computing systems and methods, as described herein, reduce error by translating the conceptual data model, based the DSL based commands, into property settings or instructions, such as SQL, specific to many different databases. This reduces errors that can emerge from the need to configure such different databases manually. Similarly, a common data format may be stored and/or returned in order to streamline storage and/or querying a given data warehouse, even though the underlying databases may store data or information in different formats. For example, inbound and output data may be translated to and from various data types in a common format (e.g., JSON, XML, etc.), which reduces errors from using different data across different databases.

In yet another advantage, a user of the adaptable data warehousing computing systems and methods as described herein can manipulate a conceptual data model using a graphical user interface, and using terminology from his or her business domain, such that the user does not need specific know-how for the logical and physical data modeling, or underlying database. Therefore, business users, through a GUI, are able to graphically and/or independently create, modify and extend the conceptual model in a flexible manner. In this way, the need for technical BI experts is reduced and the business users are enabled to independently create the data products they need for their given respective analyses.

In addition, the present disclosure includes specific features other than what is well-understood, routine, conventional activity in the field, and that add unconventional steps that confine the claim to a particular useful application, e.g., adaptable data warehousing computing systems and methods for programmatic modeling and database building.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts a particular aspect of the disclosed system and methods, and that each of the Figures is intended to accord with a possible aspect thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present aspects are not limited to the precise arrangements and instrumentalities shown, wherein:

FIG. 2 illustrates an example relationship between example business objects of a conceptual data model, in accordance with various aspects disclosed herein.

FIG. 3 illustrates an example of the domain specific language (DSL) comprising a declarative computing command, in accordance with various aspects disclosed herein.

FIG. 4 illustrates an example of DSL comprising declarative computing commands for altering one or more business objects, in accordance with various aspects disclosed herein.

FIG. 5 illustrates an example of DSL comprising declarative computing commands for defining relationships between business objects, in accordance with various aspects disclosed herein.

FIG. 6 illustrates an example of DSL comprising a declarative computing command for defining calculated attributes, in accordance with various aspects disclosed herein.

The Figures depict preferred aspects for purposes of illustration only. Alternative aspects of the systems and methods illustrated herein may be employed without departing from the principles of the invention described herein.

DETAILED DESCRIPTION OF THE INVENTION

Figure 1:
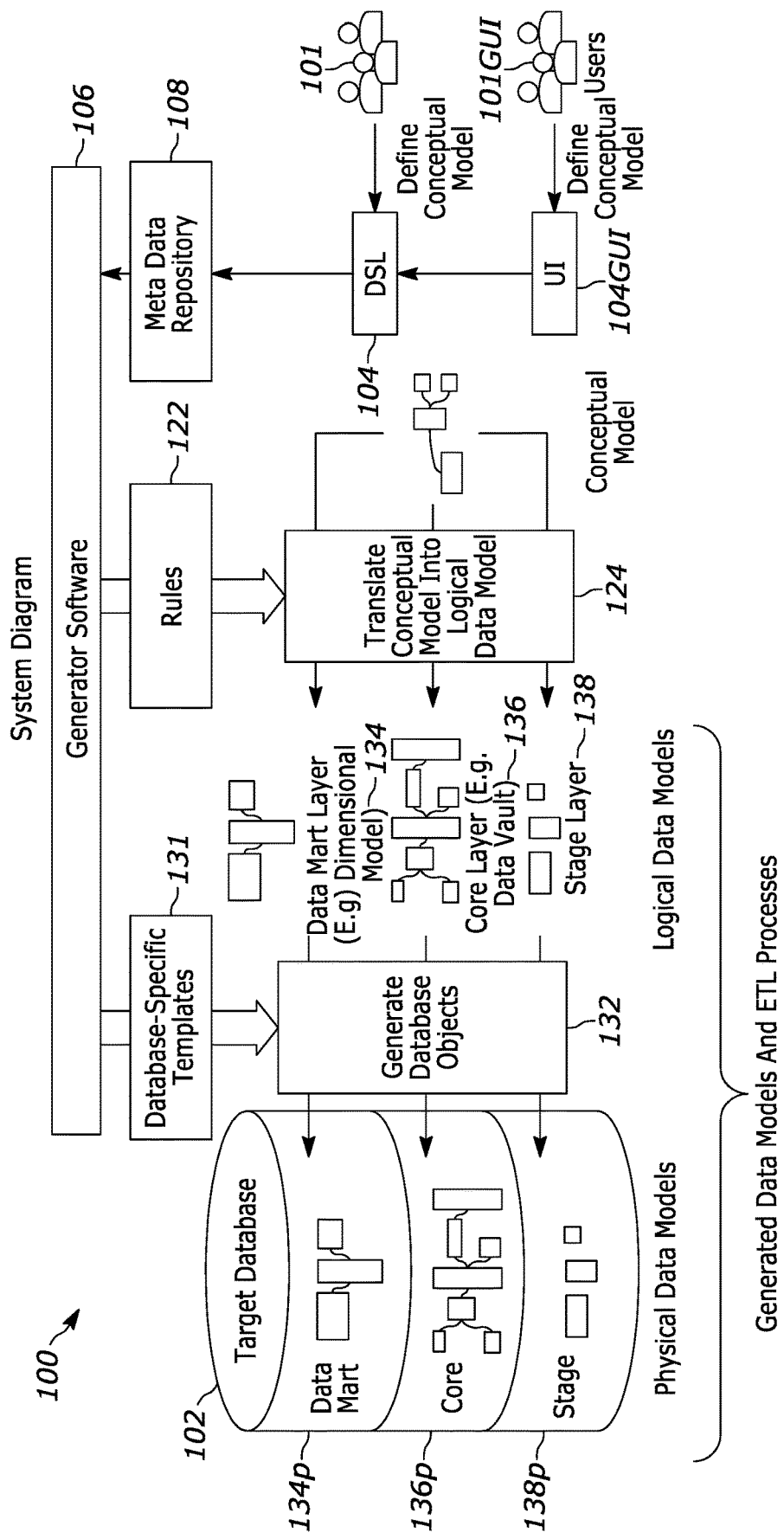
FIG. 1 illustrates an adaptable data warehousing computing system configured for programmatic modeling and database building, in accordance with various aspects disclosed herein.

FIG. 1 illustrates an adaptable data warehousing computing system 100 configured for programmatic modeling and database building, in accordance with various aspects disclosed herein. As shown for FIG. 1, adaptable data warehousing computing system 100 comprises a target database 102. Target database 102 may include one or more database(s), a database platform, and/or data warehousing platform, including, by way of non-limiting example, an EXASOL database or data warehouse, an Amazon Web Services (AWS) database or data warehouse, or the like. More generally, target database 102 may provide transactional services (e.g., for storing, updating, adding, deleting, and/or querying) data. In addition, target database 102 may also comprise a data warehouse, which can provide analytical processing. The data warehouse may be implemented as a layer on top of another database or databases, which may include a transactional database. In such implementations, a data warehouse can use data from each of its databases to create one or more layers optimized for and dedicated to analytics.

In various aspects, one or more processors may be communicatively coupled to target database 102 for inserting, reading, altering, and/or deleting data in target database 102. The processor(s) may execute computing instructions, such as those of the declarative scripting engine 104, generator software component 106, and/or as otherwise described herein. For example, the processor(s) may execute or implement the domain specific language (DSL) as described herein. The processor(s) may also execute computing instruction in other language(s) including, by way of non-limiting example, Java, C++, C#, Python, SQL, or the like.

The processor(s) may be communicatively coupled to one or more computer memories accessible by the one or more processors. The memories of the servers may comprise one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memories may store an operating system (OS) (e.g., Microsoft Windows, Linux, UNIX, etc.) capable of facilitating the functionalities, apps, methods, or other software as discussed herein.

The memories(s) may store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, the memories may store a declarative scripting engine (104), a generator software component (106), DSL, and/or other computing instructions as describe herein.

The processor(s) may comprise those of one or more servers of the adaptable data warehousing computing system 100 of FIG. 1. Such server(s) may comprise multiple servers, which may comprise multiple, redundant, or replicated servers as part of a server farm. In still further aspects, the server(s) may be implemented as cloud-based servers, such as a cloud-based computing platform. For example, data stream server(s) may be any one or more cloud-based platform(s) such as MICROSOFT AZURE, AMAZON AWS, or the like. In various aspects, the server(s) may perform the functionalities as discussed herein as part of a cloud network or may otherwise communicate with other hardware or software components within the cloud to send, retrieve, or otherwise analyze data or information as described herein.

In addition, the servers may implement a client-server platform technology such as ASP.NET, Java J2EE, Ruby on Rails, Node.js, a web service or online API, responsive for receiving and responding to electronic requests to the adaptable data warehousing computing system 100 and may receive responses in return. Such responses can comprise information, graphics, and/or other data (e.g. formatted in JSON, XML, etc.), for example, as described for the various flowcharts, illustrations, diagrams, figures, and/or other disclosure herein. For example, as shown for FIG. 1, graphic user interface (GUI) 104GUI may comprise a mobile native application (app) (e.g., implemented on a mobile device such as an APPLE IOS device) or web browser based application (e.g., GOOGLE Chrome implemented on a personal computer (PC)) configured to send requests to the client-server platform technology that may interact, via the computer bus, with the memories (including the applications(s), component(s), API(s), data, etc. stored therein) and/or target database 102, to implement or perform the machine readable instructions, methods, processes, elements or limitations, as illustrated, depicted, or described for the various flowcharts, illustrations, diagrams, figures, and/or other disclosure herein.

With further reference to FIG. 1, adaptable data warehousing computing system 100 comprises a declarative scripting engine 104. Declarative scripting engine 104 may be stored on the computer memories of a server (as described) and can be accessible by the one or more processors of the server. The declarative scripting engine 104 is configured to execute declarative computing commands defined by a domain specific language (DSL). The DSL is a modifiable language for programmatically configuring a conceptual data model. That is, the DSL allows the user to fully define and modify a conceptual data model, including, for example, by defining one or more business objects. In some aspects, the business objects may be instantiated in an underlying programming language, such as Java, C++, C#, Python or the like.

The DSL provides a high-level language for creating the conceptual data model without needing to implement a given database technologies syntax, formatting, input, settings, and/or priority code. Said another way, various database technologies may have different technical differences, including syntax, formatting, input, settings differences, and/or priority code, which makes accessing data across these various different databases difficult and computationally inefficient. DSL provides a high-level language that can be written once, and implemented across the various database technologies, despite technical differences. The DSL, when implemented by the generator software component 106, can covert or translate data to and from various different database(s). Such conversion or formatting may comprise converting or formatting into one or more open source protocol standards (e.g., JSON, XML, etc.) for universal data processing and/or retrieval across the adaptable data warehousing computing system 100. Examples of DSL are shown and described herein for FIGS. 3-6.

With further reference to FIG. 1, generator software component 106 comprises computer-executable instructions stored on one or more memories and, that can be executed by one or more processors of one or more server(s), for example, as described herein. As shown for FIG. 1, generator software component 106 is configured to input a declarative command having a programmatic syntax in the DSL. For example, as shown for FIG. 1, a user 101 can define a conceptual model by inputting a declarative command comprising DSL 104. In various implementations, the declarative command defines one or more business objects of the conceptual data model. The conceptual data model describes or otherwise defines the business objects (e.g., a person or thing), their attributes (e.g., a gender or net price of a product or other properties), and/or relationships between the business objects. The conceptual model implements terms from a business domain and obfuscates or otherwise implements, at a lower processing level, technical definitions of data models, which may be specific to proprietary or otherwise disparate databases or database platforms. A business key of a business object can specify attributes that identify the instance of a business object (e.g., a product number or other unique identifier).

In various implementations, each business object may have one or more attributes. The attributes of the business objects can represent data from sources directly (source attributes) or be calculated from other attributes (calculated attributes). Source attributes can be mapped to the source structures (e.g., columns of database tables and also fields in structured files). In addition, source columns can be assigned for the source attributes of a given business object. Each business object may have a key (e.g., a unique value) that uniquely identifies a given business object in the conceptual data model. These features are further described and shown herein, including, for example, for FIG. 8 herein.

FIG. 3 illustrates an example of DSL 300 comprising a declarative computing command 302, in accordance with various aspects disclosed herein. The declarative computing command 302 includes descriptive text for use as input. In the example of FIG. 3, the declarative computing command 302 includes descriptive text for defining or otherwise configuring in a data source (named "Sales") of a business object named "CUSTOMER" having a location (e.g., a table or otherwise memory location) also defined by the alias "CUSTOMER." As shown for FIG. 3, the declarative computing command 302 defines the CUSTOMER object with various attributes, including, by way of non-limiting example, an attribute defining a "BIRTH_DATE" (e.g., a table name) with a DATE data type and with the alias "Birth Date," and an attribute defining a "CITY" (e.g., a table name) with a VARCHAR data type (with character length 100) and with the alias "City." Additional attributes are shown for the declarative computing command 302, each of which define a field (e.g., a table name), a data type, and a alias or name for the given business object.

In one example, DSL 300 may be input into a text-based prompt. This is represented, for example as shown for FIG. 1, where a user 101 can define a conceptual model by inputting a declarative command directly into a prompt of declarative scripting engine 104.

In various implementations, each business object may define one or more relationships between one or more other business objects. Relationships between business objects can be assigned a cardinality for a conceptual data model. The cardinality may comprise, by way of non-limiting example, any of one-to-one (1:1), one-to-many (1:n), many-to-one (n:1), or many-to-many (n:m). FIG. 2 illustrates an example relationship between example business objects of a conceptual data model 200, in accordance with various aspects disclosed herein. For example, airport business object 202 and flight business object 204 have multiple relationships with one another. Airport business object 202 may comprise a data object defining an airport, with an airport code (e.g., CDG) as a business key or other unique value. Flight business object 204 may comprise a data object defining a flight, with a flight number (e.g., FK109) as a business key or other unique value. Other information of the flight business object 204 may comprise a type of aircraft, number of passengers, and/or other flight information. An arrival airport relationship 206 is defined as a one-to-many (1:n) relationship between flight business object 204 and airport business object 202, where there may be many different flights arriving at the airport defined by the airport business object 202. Similarly, departure airport relationship 208 is defined as a one-to-many (1:n) relationship between flight business object 204 and airport business object 202, where there may be many different flights departing the airport defined by the airport business object 202. Thus, in the example of FIG. 2, relationships between flights, and their respective arrival and departure airports, may be defined by the conceptual data model 200.

FIG. 5 illustrates an example of DSL 500 comprising declarative computing commands 502 and 504 for defining relationships between business objects, in accordance with various aspects disclosed herein. As shown for FIG. 5, declarative computing command 502 defines the departure airport relationship 208 of FIG. 2, which is defined as a one-to-many (1:n) relationship between flight business object 204 and airport business object 202. Further, declarative computing command 504 defines the arrival airport relationship 206, which is defined as a one-to-many (1:n) relationship between flight business object 204 and airport business object 202. The DSL 500 comprising declarative computing commands 502 and 504 define code for instantiating the relationships in the conceptual data model, which are to be later translated into the logical data model and physical data model by the generator software component 106, for example, as described herein for FIGS. 1 and 11.

In various aspects, declarative computing commands, as implemented in DSL, can be executed in a GUI, such as GUI 104GUI, by a GUI-based user 101GUI as shown for FIG. 1. That is, a declarative command can be generated based on input from a graphic user interface such as 104GUI. 104GUI can be used to define a conceptual model, e.g., via business objects. In particular, the actions in the GUI may then then be automatically translated into the corresponding DSL commands, which may then be used to generate the various models, e.g., the conceptual data model, the logical data model, etc. as described herein.

In various implementations, 104GUI of FIG. 1 represents each of the GUIs described herein, including the GUIs as described for FIGS. 7-10. In some implementations, 104GUI may be implemented or rendered via a web interface, such as via a web browser application, e.g., Safari and/or Google Chrome app(s), or other such web browser or the like. Additionally, or alternatively, 104GUI may be implemented or rendered via a native app executing on user computing device, such as an APPLE IOS device or a GOOGLE ANDROID based device. In various aspects 104GUI may be rendered on a display screen of monitor or mobile device, and may implement code for communicating to a server, such as a server of adaptable data warehousing computing system 100 of FIG. 1.

Figure 7:
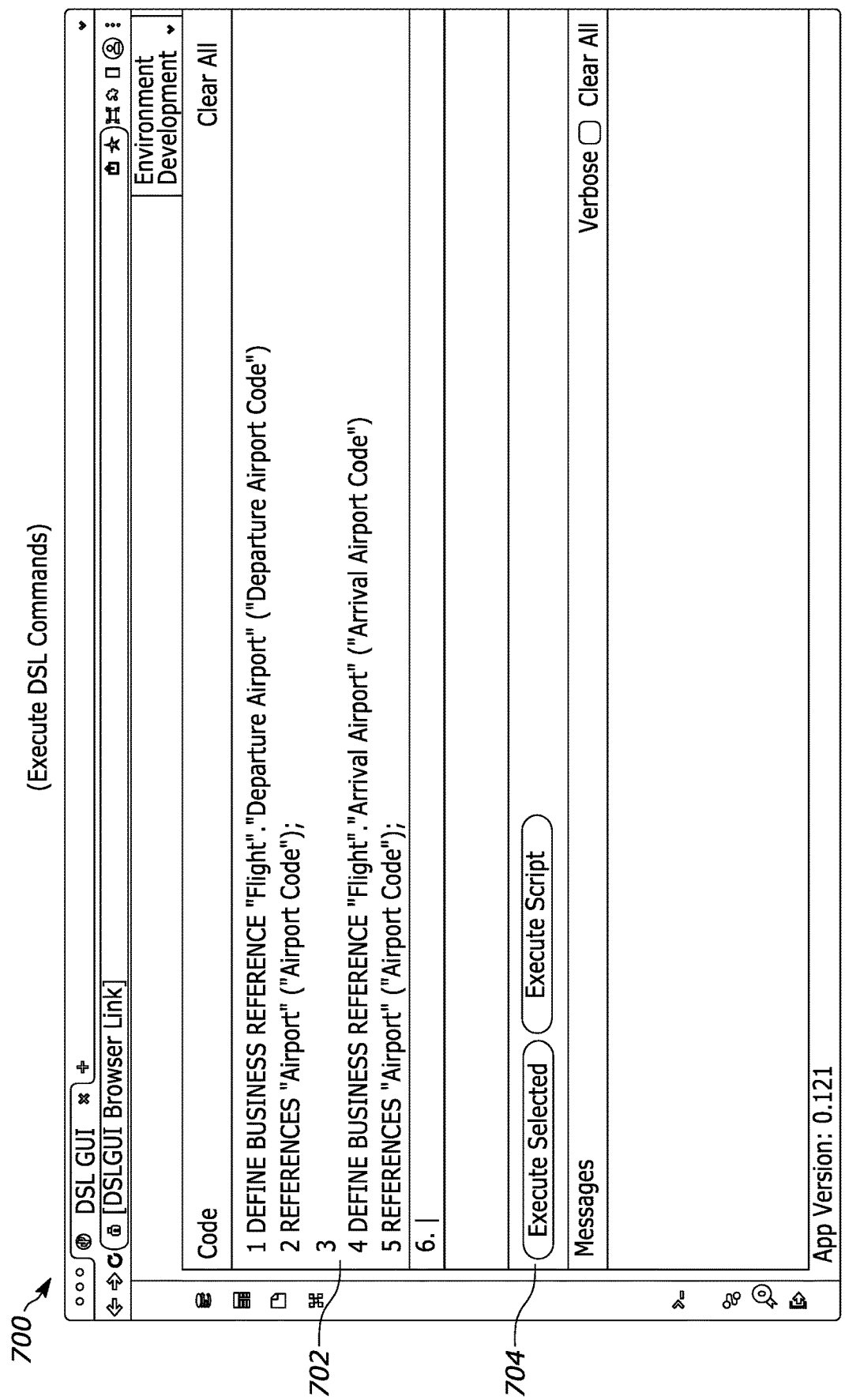
FIG. 7 illustrates an example graphic user interface (GUI) for entering and executing DSL declarative computing commands, in accordance with various aspects disclosed herein.

FIG. 7 illustrates an example graphic user interface (GUI) 700 for entering and executing DSL declarative computing commands, in accordance with various aspects disclosed herein. In various aspects, GUI 700 may be, or be implemented as part of, GUI 104GUI as shown and describe for FIG. 1 or elsewhere herein. GUI 700 includes a code section 702 for receiving a given declarative computing command. In the example FIG. 7, the declarative computing command include code for defining the business objects and relationships (e.g., flight business object 204 and arrival airport relationship 206) as described for FIG. 2 herein. A user (e.g., such as user 101 or GUI-based user 101GUI) can select execute selected button 704 to cause the declarative computing command to be generated into DSL, which can then be used to generate or configure the conceptual data model, and, as a result the logical data model, and physical data model as describe herein.

In various aspects, GUI based modeling with business objects based via DSL makes configuring database(s) or otherwise data warehouses efficient and with fewer errors compared to conventional database modeling. For example, the GUI based modeling with business objects based via DSL can be configured to interoperate with underlying database and data warehousing technology (e.g., Microsoft AZURE database, the EXASOL database, AWS database, SNOWFLAKE database, etc.) regardless of technical differences, including different configuration parameters, syntaxes, and data formats used. GUI based modeling with business objects based via DSL allows configuration to align with various database and data warehousing designs to facilitate various fits to different data structures. For example, a user may use 104GUI to add or alter new data requiring a new data vault/data type. The GUI based modeling with business objects based via DSL automatically creates abstractions via the various data layers to decouple the business objective (e.g., as defined by the conceptual data model) from the underlying database, e.g., as defined by the physical data model. In this way, the GUI based modeling with business objects based on DSL creates abstractions for access to data in a technically agnostic implementation, which reduces errors that occur from using an incorrect proprietary syntax intended for one database, but where the target database required a different proprietary syntax.

Figure 8:
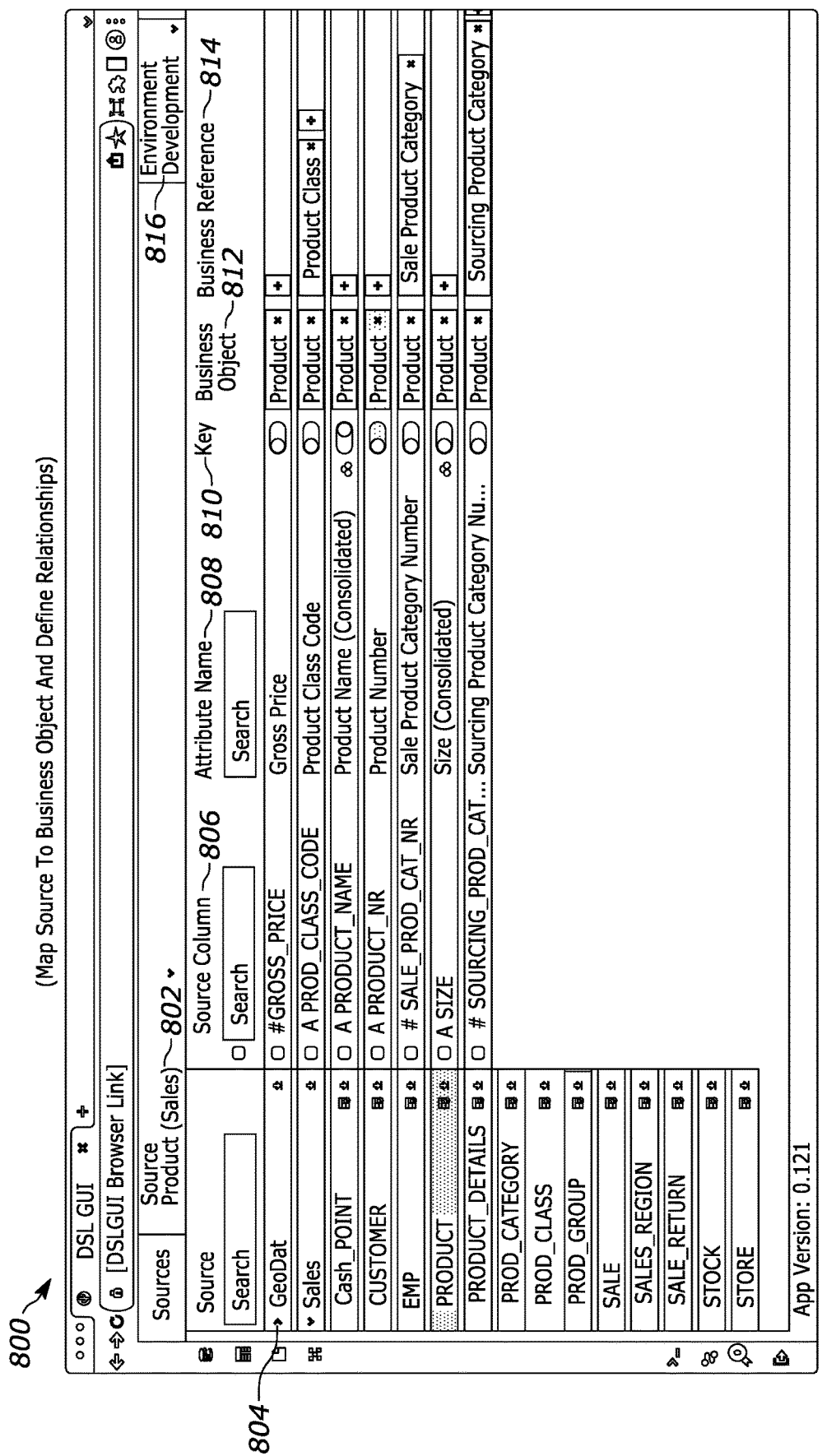
FIG. 8 illustrates an example GUI for mapping DSL source to a business object and defining respective relationships of the business object, in accordance with various aspects disclosed herein.

FIG. 8 illustrates an example GUI 800 for mapping DSL source to a business object and defining respective relationships of the business object, in accordance with various aspects disclosed herein. In various aspects, GUI 800 may be, or be implemented as part of, GUI 104GUI as shown and describe for FIG. 1 or elsewhere herein. GUI 800 depicts a web browser-based GUI example showing information of source values for a Product business object 802 associated with "Sales." Product business object 802 is being developed, as part of the conceptual data model, in the development environment 816. GUI 800 depicts sources of the Product business object 802 as shown in panel 804. The Product business object 802 comprises source columns 806, including, by way of non-limiting example, a GROSS_PRICE source column, a PROD_CLASS_CODE source column, a PRODUCT_NAME source column, a PRODUCT_NR source column, a SALE_PROD_CAT_NR source column, a SIZE source column, and a SOURCING_PROD_CAT source column. Source columns 806 may correlate to columns to be created in a database, values in a file, or otherwise values in a data warehousing platform. It is to be understood that additional, fewer, or different source columns or values may also be implemented.

With further reference to FIG. 8, GUI 800 also has attribute names 808 that correspond to the source columns 806 and may be used as aliases when accessing the values or data in underlying database tables associated with the Product business object 802. Still further, one or more of the values of the source columns 806 and/or attribute names 808 may be designed as key values 810. A key value may be a unique value to distinguish a source or business object in a database or otherwise model (e.g., conceptual data model). As shown for the example of FIG. 8, the Product Number source column and/or attribute name has been designated as a key value. In addition, each of the source columns 806 and/or attribute names 808 may be designated as belonging to one or more business objects. As shown for the example of FIG. 8, the source columns 806 and/or attribute names 808 are each designated as belonging to the Product business object 802. Still further each of the source columns 806 and/or attribute names 808 may be linked, assigned, or designed with a business reference 814, which, in the example of FIG. 8, comprises a Product Class reference for the PROD_CLASS_CODE source column, a Sales product Category for the SALE_PROD_CAT_NR source column, and a Sourcing Product Category for the SOURCING_PROD_CAT source column. Such business references provide a classification or categorization for grouping or otherwise identifying as a group of similar source column(s) and/or attribute name(s) tagged with the same business references.

Thus, as described for FIG. 8, the GUI 800 allows a GUI that allows selecting and/or manipulating business objects, attributes, or otherwise values for defining the conceptual data model. For example, as shown for FIG. 8, attributes (e.g., source columns 806 and/or attribute names 808) of a business object can represent data from the sources directly (source attributes) or be calculated from other attributes (calculated attributes, e.g., as shown and described for FIGS. 6 and 9 herein). Source attributes can be mapped to the source structures (e.g., columns of database tables and also to fields in structured files). In addition, source columns are assigned for the source attributes of a given business object. Each business object may have a key (e.g., a unique value) that uniquely identifies a given business object in the conceptual data model.

In various implementations, some attributes may comprise a calculated attribute. A calculated attributed may be defined by the DSL and configured to cause the calculated attribute to be generated based on one or more other attributes. A calculated attribute can extend the conceptual data model with measures and respective calculations based on existing attributes or otherwise elements of the conceptual data model, including, for example, existing attributes or otherwise elements of business objects of the conceptual data model. Calculations of a given calculated attribute may be specified as formulas. Existing attributes of the conceptual data model may be referenced in the formulas. An example formula may comprise, e.g., "Gross price"="Net price"*(100+"VAT in percent"), where "Gross price" is the name of the calculated attribute, and where the formula includes the existing attribute (and related value when queried) of "Net price" times (*) the existing attribute (and related value when queried) of "VAT in percent" (added to 100).

Accordingly, in various implementations, the calculated attributes may be assigned to a business object. For a calculated attribute of a business object, a formula may be specified with the attributes referenced in the calculation. The formulas can be specified as DSL expressions, or, additionally, or alternatively, SQL expressions, of the target database (e.g., target database 102). Therefore, calculated attributes are referenced in the formulas and provide an alternative implementation instead requiring concrete or otherwise fixed table columns, or proprietary languages, of the logical data model or physical data model.

Still further, in some implementations, calculated attributes may be configured to define relationships between business objects and/or timelines of business objects. Such relationships or timelines may be defined in one or more formulas of a given calculated attribute. For example, there can be multiple relationships between two business objects, e.g., as shown and described for FIG. 2 herein. Moreover, with respect to a calculated attribute, if one of the business objects is referenced or otherwise used in the formula of a calculated attribute, the relationship between the business objects to be used in the calculation of the calculated attribute may be specified.

Timelines may also be specified for a calculated attribute. If multiple timelines exist for a business object and the business object is used in the formula of a calculated attribute, it may be specified for which timeline it is to be used in the calculation of the calculated attribute.

FIG. 6 illustrates an example of DSL 600 comprising a declarative computing command 602 for defining calculated attributes, in accordance with various aspects disclosed herein. In the example of FIG. 6, declarative computing command 602 defines a calculated attribute named "Amount in Cash." The calculated attributed comprises a formula that determines that, when it is the case that a given sale ('Sale') value has a value of 'C' (e.g., indicating a cash sale), then a value for the Amount in Cash calculated attributed is calculated as the sale quantity ('Sale'.'Quantity') times (*) the gross price ('Sale Product'.'Gross Price'). Once the declarative computing command 602 is executed by the generator software component 106, e.g., to create the logical data model and the physical data model, and thus instantiate the target database 102, as described herein, the value of the Amount in Cash, once calculated, can be returned in response to a query to target database 102.

Figure 9:
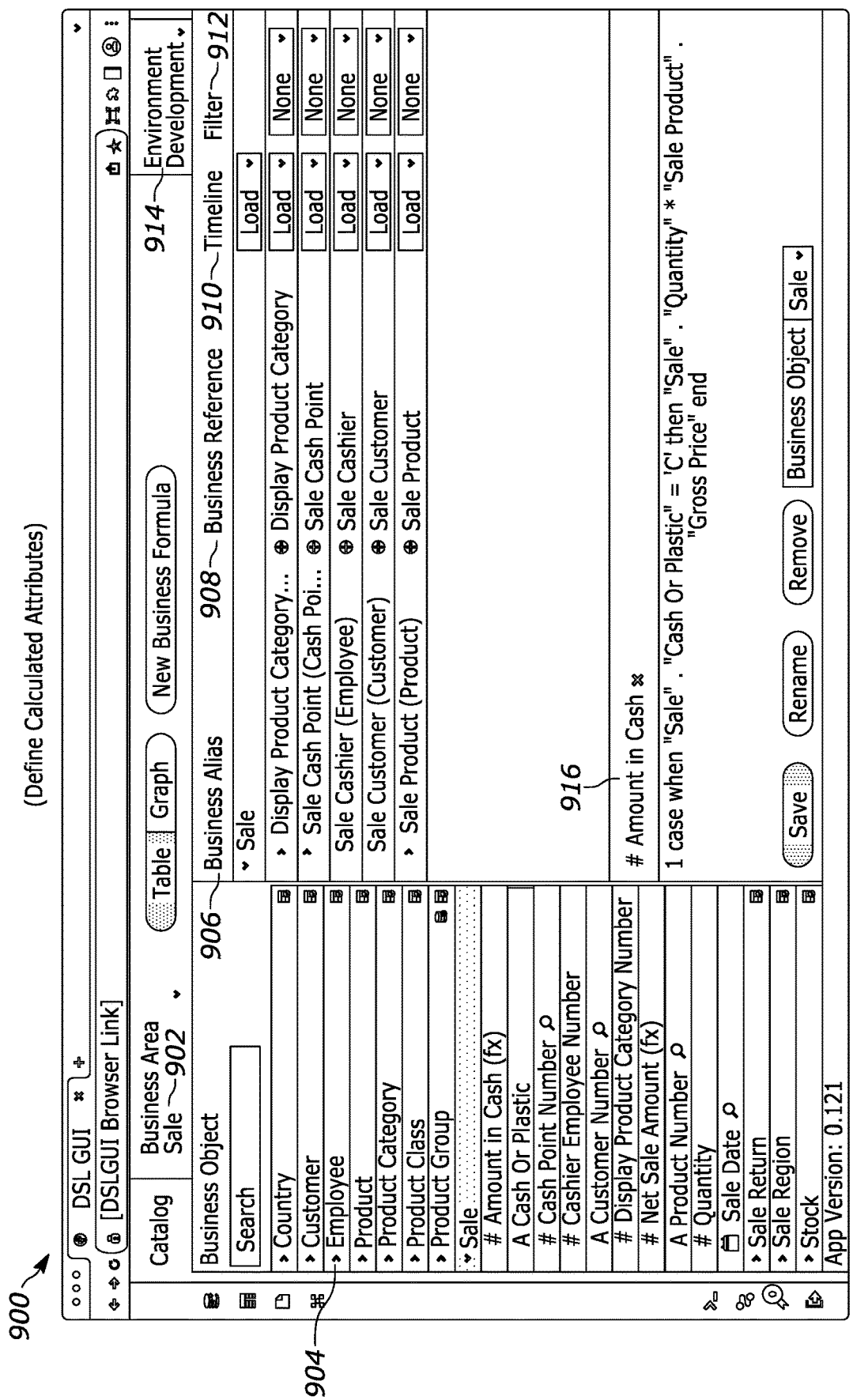
FIG. 9 illustrates an example GUI for defining calculated attributes, in accordance with various aspects disclosed herein.

FIG. 9 illustrates an example GUI 900 for defining calculated attributes, in accordance with various aspects disclosed herein. In various aspects, GUI 900 may be, or be implemented as part of, GUI 104GUI as shown and describe for FIG. 1 or elsewhere herein. GUI 900 depicts a web browser-based GUI example showing information for a calculated attribute for a business object 902 with the name "Sale." The Sale business object 902 is being developed, as part of the conceptual data model, in the development environment 914. In one aspect, the example of FIG. 9 represents a GUI based example of the calculated attribute of FIG. 6 as described herein. With further reference to FIG. 9, GUI 900 depicts the attributes of the Sale business object 902, including calculated attributes, is shown in panel 904. As shown, panel 904 shows that the Sale business object includes the Amount in Cash calculated attributed. The formula for the Amount in Cash calculated attributed is shown in the lower panel of GUI 900 (i.e., the "Amount in Cash" tab 916), which includes the same or similar formula of the Amount in Cash calculated attributed as shown and described herein for FIG. 6.

In addition, GUI 900 depicts an example loading timeline for the Sale business object of FIG. 9. As shown, the Sale business object has several Business Alias values 906 including, by way of non-limiting example, a Display Product Category, a Sale Cash Point, a Sale Cahier, a Sale Customer, and a Sale Product. The Business Alias values 906 can have corresponding Business Reference values 908 (as shown for FIG. 9), and which can be used to create table or attribute names in an underlying database. Generally, a business reference describes a relationship between two business objects, such as the relationships described, by way of non-limiting example, for FIG. 2. With further reference to FIG. 9, a Business Alias values 906, values as indicated by the Business Alias values 906, and/or Business Reference values 908 may be loaded according to a timeline 910, which dictates which values are to be loaded at what time and in what order, and/or in a given hierarchy. In this way, a timeline (e.g., such as timeline 910) can be used to load values that are dependent on other values. Further, as shown for FIG. 9, values may be subject to one or more filters 912, which may apply formulas to values when such values are loaded, queried, added, deleted, altered, or otherwise manipulated.

In some implementations the DSL is configured to specify a timeline in the conceptual data model. Timelines may be provided for, or in, a source, if applicable. Timelines may comprise, e.g., a load timeline, a source-based timeline (e.g., an inscription timeline), a business timeline defined by the business (e.g., defined by BI), which may be defined a specific use-case. For example, in one implementation, when loading source data into a database or data warehouse platform, the time of loading can be determined automatically. The resulting timeline may also be referred to as a load timeline. Data sources can provide source columns defining further additional timelines, e.g., the time when the data was entered in the source. By specifying additional timelines, multi-temporal business objects are created whose data modeling and loading by the ETL processes is very complex. By including information about other timelines in the conceptual model, both the data modeling and the creation of ETL processes can also be efficiently and completely automated despite the complexity of a given ETL process, e.g., as shown for FIG. 1.

For example, in various implementations, generator software component 106, as shown for FIG. 1, may be configured for execution to create, based on a timeline, an extraction, transformation and loading (ETL) process that, when executed by the one or more processors, implements a sequence of time-based or hierarchical-based loading of one or more sources or source columns of the logical data layer or the physical data model. The one or more sources or source columns may be selected based on the one or more attributes, or other values or elements, of a conceptual data model.

With further reference to FIG. 1, at block 108 a metadata repository may be accessed to annotate a declarative command (e.g., declarative computing command 302) prior to generation of a logical data model. For example, a given declarative command can have a programmatic syntax in the DSL annotated with metadata at block 108, which can be implemented by generator software component 106. More generally, generator software component 106 may use the metadata, declarative command(s), and/or the conceptual data model, or any aspect thereof (e.g., one or more business objects), to generate various layers of code responsible for moving, formatting, creating, mapping, or otherwise manipulating data to underlying database(s) and data warehousing platform. Generator software component 106 may generate, create, format, merge, or otherwise manipulate any database table, any table constraint, metadata, and the like, according to the metadata, declarative command(s), and/or the conceptual data model, or any aspect thereof (e.g., one or more business objects).

With further reference to FIG. 1, one or more processor(s) (e.g., of a server of adaptable data warehousing computing system 100) may execute the instructions of the generator software component 106, at block 124, to generate or otherwise translate the conceptual data model into a logical data mobile. This may comprise generating, based on a declarative command and/or otherwise the conceptual data model, and, optionally, a set of logical layer rules 122, the logical data model. In various implementations, the logical data model may define one or more logical layers comprising: a stage layer 138, a core layer 136, and/or a data mart layer 134, for example, as shown for FIG. 1.

In some implementations, when the set of logical layer rules 122 is implemented, the one or more processors can implement, or otherwise access, the set of logical layer rules 122 to translate the conceptual model into the logical data model based on a specified data modeling algorithm. For example, the set of logical layer rules 122 may be used to translate a conceptual data model into the logical data model where the rule set is specific to the data modeling implementation being executed, which may comprise, by way of non-limiting example, e.g., a Data Vault and/or Dimensional Modeling implementation. For example, the rule set of the of logical layer rules 122 for a Data Vault modeling implementation may specify that a hub table is created for each business key and a link table is created for each relationship between business objects. The hub table defines a logical central table to which other tables (e.g., link tables) can reference via a business key (e.g., a key value defined for a business object in the conceptual data model).

With further reference to FIG. 1, the one or more processor(s) may execute the instructions of the generator software component 106 to generate, based on the logical data model and one or more database-specific templates, one or more database objects 132. Generator software component 106 may access and use database-specific templates to generate a physical data model for the desired target database (e.g., target database 102) from the logical data model, and its related layers, e.g., stage layer 138, core layer 136, and/or data mart layer 134, as described herein.

With further reference to FIG. 1, the one or more processor(s) may execute the instructions of the generator software component 106 to update, based on the one or more database objects 132 of the logical data model, a target database (e.g., target database 102) to define a physical data model. In various implementations, the physical data model defines physical data model layers (134p, 136p, and 138p) derived from the same type of layer as selected from the one or more logical layers (134, 136, or 138). That is, and as shown for FIG. 1, generator software component 106 uses stage layer 138, core layer 136, and/or data mart layer 134 of the logical data layer to generate one or more database objects 132. Database objects 132 may comprise programming objects stored in computer memory, which can be, by way non-limiting example, objects of an object-oriented programming language such as C++, C#, Java, or the like. Each of the database objects 132 may be generated for a given logical layer, such that, in the example of FIG. 1, there is a stage layer database object, a core layer database object, and a data mart layer database object corresponding to each of the stage layer 138, core layer 136, and/or data mart layer 134 of the logical data model. Generator software component 106 may then use the database objects 132, together with the one or more database-specific templates 131, to generate physical data model layers, including each of stage physical layer 138p, core physical layer 136p, and/or data mart physical layer 134p of the physical data model. The target database (e.g., target database 102) may then be updated or otherwise instantiated with the stage physical layer 138p, core physical layer 136p, and/or data mart physical layer 134p to create, update, or otherwise manipulate tables, columns, attributes, calculated attributes, and/or other values or settings as described herein.

In various implementations, a conceptual data model may be deployed to a target database (e.g., target database 102) by implementing the conceptual data model, e.g., via a GUI (e.g., GUI 104GUI or other GUI as described herein), and then deploying the conceptual data model by generating the logical data model and physical data model as described herein. For example, in some implementations, a current state of the conceptual data model may be stored in a working repository on one or more computer memories (e.g., one or more computer memories of adaptable data warehousing computing system 100). In some implementations, a current state of the conceptual data model stored in the working repository can be deployed to separate target repositories (e.g., target databases, such as target database 102). Each target repository can represent different environments e.g., development, test, or production. In some implementations, a deployment of conceptual data model may include applying changes or alterations to an existing state in the target repository, and modifying the conceptual model to ultimately modify or alter the underlying physical data model(s), for example, as described for FIG. 4 herein.

For deployment of a current state of a conceptual data model, a target database (e.g., target database 102) may comprise one of a plurality of deployment environments. Generator software component (106) may be executed to deploy a current state of the conceptual data model to the one or more of the plurality of deployment environments The deployment may cause generation of respective logical data models and respective layers (e.g., layers 134, 136, or 138) and physical data models and respective layers (e.g., layers 134p, 136p, or 138p), as described herein, to update the target database at each respective deployment environment.

In various implementations, a conceptual data model may be stored, in a computer, memory as a file. For example, one or more declarative commands, in the programmatic syntax of the DSL, can be exported to an executable DSL file. The executable DSL file is configured to be executed, by the one or more processors and/or generator software component 106, to implement the declarative command at a later time. In this way, the use of the DSL for the definition of the conceptual model enables to export the repository in the form of DSL commands. The exported DSL commands can also be used as a file for version management, e.g., in a version control platform, such as GIT repository.

FIG. 4 illustrates an example of DSL 400 comprising declarative computing commands 402, 404, and 406 for altering one or more business objects, in accordance with various aspects disclosed herein. As shown in the example of FIG. 2, declarative computing command 402 comprises example DSL for altering a source corresponding to a business object of the conceptual model, and ultimately values in a database, where a "Sales". "Customer" source is altered to add a Gender column for defining a gender of a customer. Declarative computing command 404 comprises example DSL for altering a source corresponding to a business object of the conceptual model, and ultimately values in a database, where the "Sales". "Customer" source is altered to drop the Gender column. Declarative computing command 406 comprises example DSL for altering a source corresponding to a business object of the conceptual model, and ultimately values in a database, where the "Sales". "Customer" source is modified to update the length of the Gender column to variable character (VARCHAR) value of 10. One or more the comprising declarative computing commands 402, 404, and 406 may be executed by generator software component 106 to update the a given target database (e.g., target database 102).

In various implementations, any one of declarative computing commands 402, 404, and 406 may comprise an additional or new (e.g., a second) declarative command. In such implementation, generator software component 106 may be executed to input a second declarative command (e.g., any one or more of declarative computing commands 402, 404, and 406) having a programmatic syntax in the DSL. The second declarative command may be configured to initiate an alteration of the one or more business objects. Such alteration may cause the one or more processors to deploy the altered conceptual business model to be deployed to the target database (e.g., target database 102). Similar to the description, and as shown for, FIG. 1., deployment of the conceptual data model may comprise, generator software component 106, generating, based on the second declarative command and the set of logical layer rules 122, one or more second logical data models, each second logical data model defining one of: a stage layer 138, a core layer 136, and/or the data mart layer 134. Generator software component 106 may then be executed to generate, based on the second logical data models and one or more database-specific templates 131, one or more second database objects 132. Further, generator software component 106 may then be executed to update the target database to define one or more second physical data models (134p, 136, p, and 138p) based on the one or more second database objects, each second physical data model derived from a same type of logical data model as selected from the one or more second logical data models (134, 136, or 138).

Figure 10:
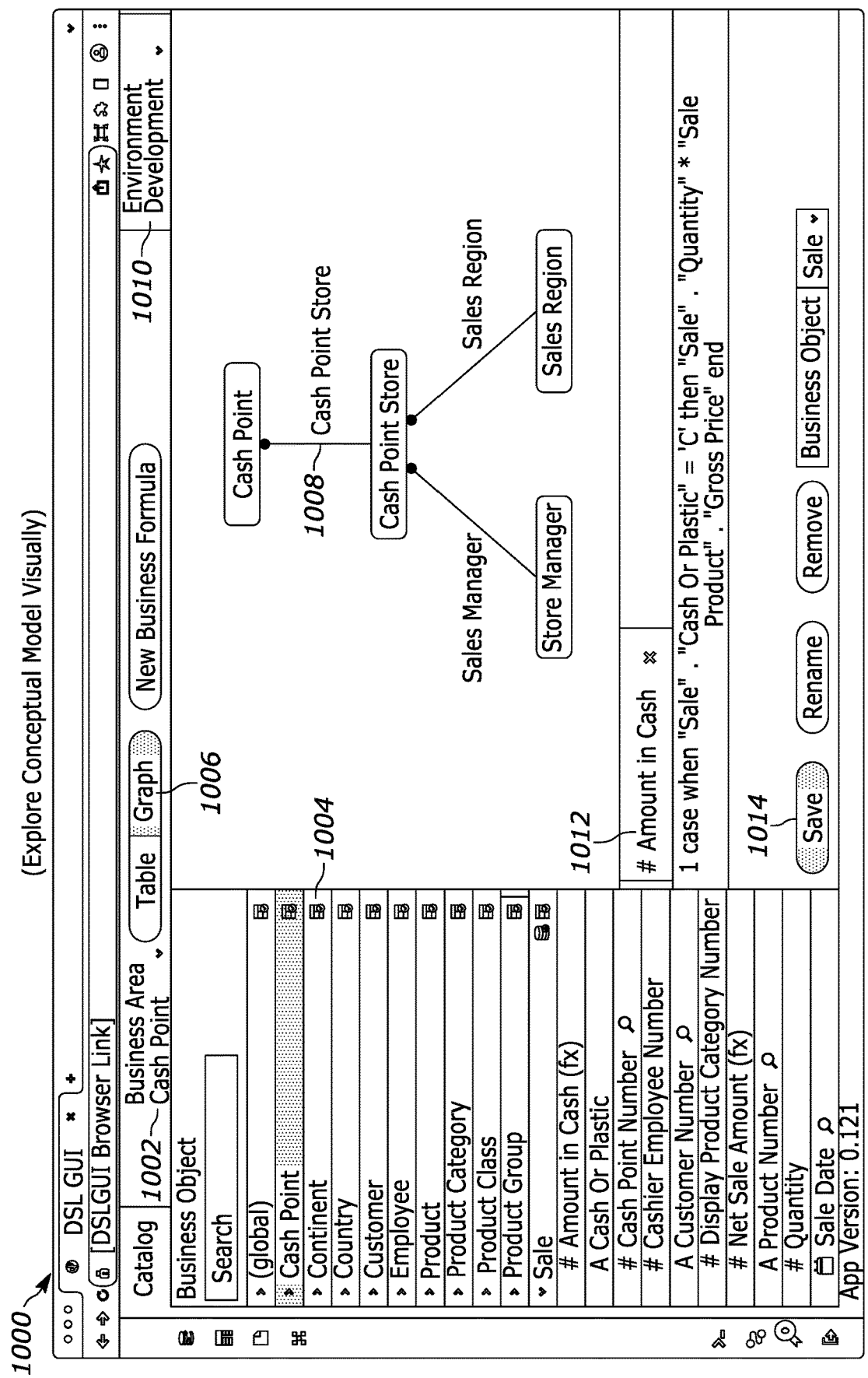
FIG. 10 illustrates an example GUI for rendering a graphical depiction of a conceptual data model, in accordance with various aspects disclosed herein.

FIG. 10 illustrates an example GUI 1002 for rendering a graphical depiction of a conceptual data model, in accordance with various aspects disclosed herein. In various aspects, GUI 1000 may be, or be implemented as part of, GUI 104GUI as shown and describe for FIG. 1 or elsewhere herein. The example of FIG. 10 illustrates that a conceptual data model can be configured to be rendered on a display as a graph model or tree model. GUI 1002 depicts a web browser-based GUI example showing a graphical tree or otherwise data hierarchy for a business object 1002 with the name "Cash Point." The Cash Point business object 1002 is being developed, as part of the conceptual data model, in the development environment 1010. GUI 1002 depicts the Cash Point business object 1002 as selected from panel 1004. As shown in the example of FIG. 10, selection of Cash Point business object 1002 from panel 1004 and/or by toggling graph mode 1006 causes GUI 1002 to render a graph model or tree model 1008. As shown, graph model or tree model 1008 depicts a rendering of a conceptual data model that includes the Cash Point business object 1002. As shown for the rendering of the conceptual data model, various references or relationships connect the Cash Point business object 1002 to other business objects in the graph model or tree model 1008. These include a Store Manager business object having a 1:n relationship with a Cash Point Store business object, which, in turn, has a 1:n relationship with the Cash Point business object 1002. Similarly, as shown for the rendering of the conceptual data model, a Sales Region business object has a 1:n relationship with the Cash Point Store business object, which, in turn, has a 1:n relationship with the Cash Point business object 1002. Tab 1012 shows a same calculated attribute formula as described herein for FIG. 9, and illustrates that GUI 1002 may depict attributes of multiple business objects at once on a given GUI.

In various implementations, the conceptual data model, e.g., in the form of a graph model or tree model (e.g., graph model or tree model 1008) is able to be rendered on the display prior to generating at least one of the logical data model or the physical data model. A user (e.g., GUI user 101GUI) may update, add to, delete from, or otherwise manipulate the graph model or tree model, which will cause the conceptual data model to be respectively updated or manipulated. Once all alterations or updates are complete, the user can save 1014 the conceptual data model to memory storage (e.g., in the form of an exported, executable DSL file). Additionally, or alternatively, a user can generate corresponding logical data layers and physical data layers for deployment to a given repository and/or database (e.g., target database 102) as described herein for FIGS. 1 and 11, or elsewhere herein.

Figure 11:
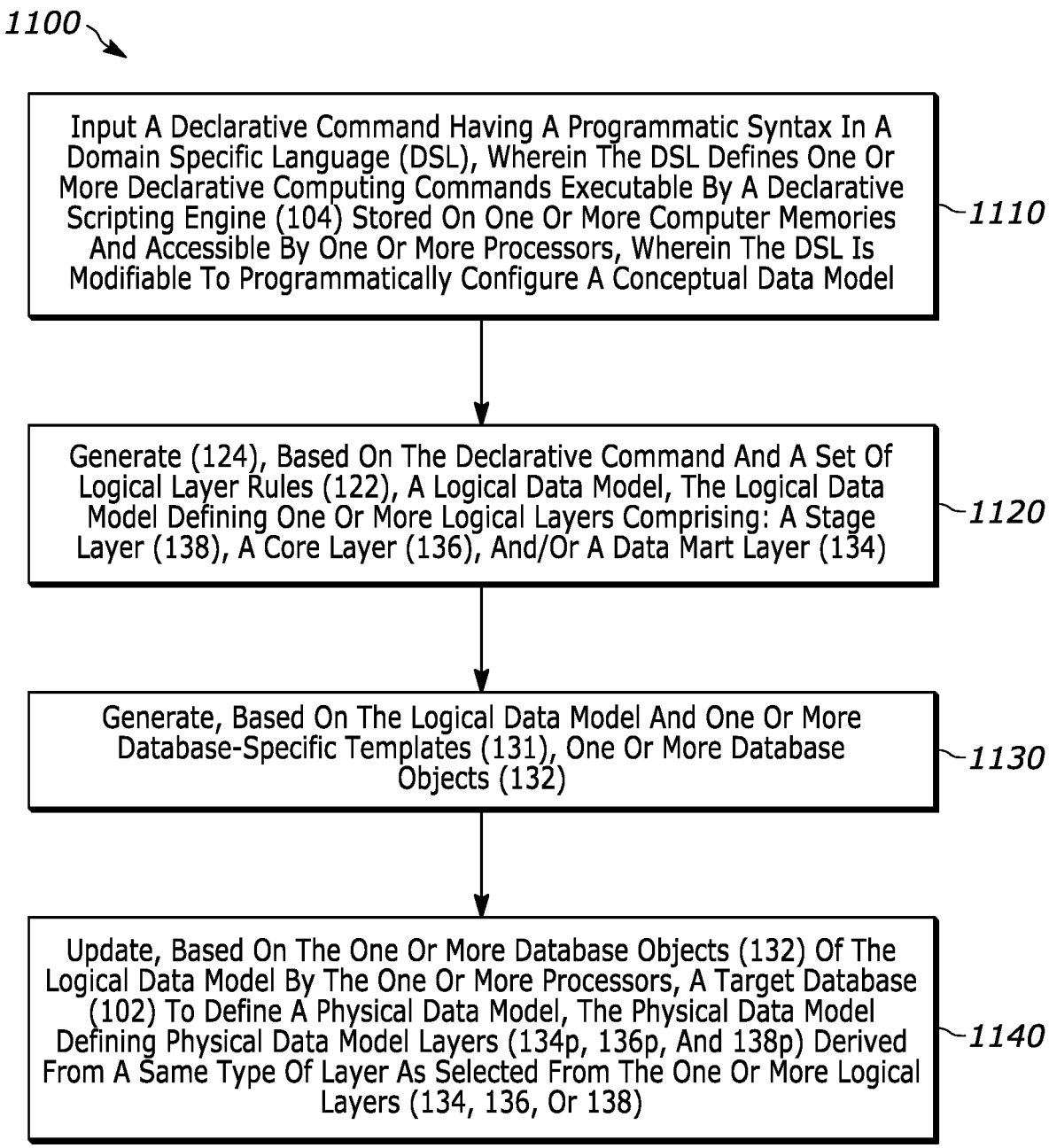
FIG. 11 illustrates an example adaptable data warehousing computing method for programmatic modeling and database building, in accordance with various aspects disclosed herein.

FIG. 11 illustrates an example adaptable data warehousing computing method 1100 for programmatic modeling and database building, in accordance with various aspects disclosed herein. Adaptable data warehousing computing method 1100 may be implemented in one or more programming languages, including, by way of non-limiting example, Java, C++, C#, Python, SQL, or the like. Still further, at least in some implementations, adaptable data warehousing computing method 1100 may be implemented by generator software component 106, including, for example as described herein for FIG. 1.

At block 1110, method 1100 comprises inputting a declarative command (e.g., declarative computing command 302) having a programmatic syntax in the DSL. The DSL is configured to define one or more declarative computing commands executable by a declarative scripting engine 104 stored on one or more computer memories and accessible by one or more processors. As described herein, the DSL is modifiable to programmatically configure a conceptual data model, e.g., by a GUI such as GUI 101GUI.

The conceptual data model can define one or more business objects (e.g., sale business object 902, Cash Point business object 1002, or other such business objects, for example, as described herein). The declarative command can define one or more business objects of the conceptual data model. Each business object can have one or more attributes and/or define one or more relationships between one or more other business objects. Such relationships are referred to Business References in a given GUI, e.g., 101GUI.

At block 1120, method 1100 comprises generating, based on the declarative command and a set of logical layer rules 122, a logical data model. The logical data model define one or more logical layers including: a stage layer 138, a core layer 136, and/or a data mart layer 134, for example, as described for FIG. 1.

At block, 1130 method 1100 comprises generating, based on the logical data model and one or more database-specific templates 131, one or more database objects (132), for example, as described for FIG. 1.

At block 1140, method 1100 comprises updating, based on the one or more database objects (132) of the logical data model by the one or more processors, a target database (e.g., target database 102) to define a physical data model. The physical data model can define physical data model layers (e.g., physical data model layers 134p, 136p, and 138p) derived from a same type of layer as selected from the one or more logical layers (e.g., logical layers 134, 136, or 138), for example, as described for FIG. 1.

Additional Considerations

Although the disclosure herein sets forth a detailed description of numerous different aspects, it should be understood that the legal scope of the description is defined by the words of the claims set forth at the end of this patent and equivalents. The detailed description is to be construed as exemplary only and does not describe every possible aspect since describing every possible aspect would be impractical. Numerous alternative aspects may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain aspects are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example aspects, the processor or processors may be located in a single location, while in other aspects the processors may be distributed across a number of locations.

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other aspects, the one or more processors or processor-implemented modules may be distributed across a number of geographic locations.

This detailed description is to be construed as exemplary only and does not describe every possible aspect, as describing every possible aspect would be impractical, if not impossible. A person of ordinary skill in the art may implement numerous alternate aspects, using either current technology or technology developed after the filing date of this application.

Those of ordinary skill in the art will recognize that a wide variety of modifications, alterations, and combinations can be made with respect to the above described aspects without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. An adaptable data warehousing computing system configured for programmatic modeling and database building, the adaptable data warehousing computing system comprising:
   a target database;
   one or more processors communicatively coupled to the target database;
   one or more computer memories accessible by the one or more processors;
   a declarative scripting engine, stored on one or more computer memories and accessible by the one or more processors, and configured to execute declarative computing commands defined by a domain specific language (DSL), wherein the DSL is modifiable to programmatically configure a conceptual data model, wherein the conceptual data model defines one or more business objects; and
   a generator software component comprising computer-executable instructions stored on one or more memories and, that, when executed by one or more processors, cause the one or more processors to:
   input a declarative command having a programmatic syntax in the DSL, wherein the declarative command defines one or more business objects of the conceptual data model, each business object having one or more attributes and/or defining one or more relationships between one or more other business objects,
   generate, based on the declarative command and a set of logical layer rules, a logical data model, the logical data model defining one or more logical layers comprising:
   a stage layer, a core layer, and/or a data mart layer,
   generate, based on the logical data model and one or more database-specific templates, one or more database objects, and
   update, based on the one or more database objects of the logical data model, the target database to define a physical data model, the physical data model defining physical data model layers derived from a same type of layer as selected from the one or more logical layers.

2. The adaptable data warehousing computing system of claim 1, wherein the declarative command having a programmatic syntax in the DSL is annotated with metadata.

3. The adaptable data warehousing computing system of claim 1, wherein the declarative command is generated based on input from a graphic user interface.

4. The adaptable data warehousing computing system of claim 1, wherein generator software component further comprises computer-executable instructions, that, when executed by one or more processors, cause the one or more processors to:
input a second declarative command having a programmatic syntax in the DSL, wherein the second declarative command is configured to initiate an alteration of the one or more business objects, wherein the alteration causes the one or more processors to:
generate, based on the second declarative command and a set of logical layer rules, one or more second logical data models, each second logical data model defining one of: the stage layer, the core layer, and/or the data mart layer,
generate, based on the second logical data models and one or more database-specific templates, one or more second database objects, and
update the target database to define one or more second physical data models based on the one or more second database objects, each second physical data model derived from a same type of logical data model as selected from the one or more second logical data models.

5. The adaptable data warehousing computing system of claim 1, wherein at least one of the one or more attributes comprises a calculated attribute, the calculated attributed defined by the DSL and configured to cause the calculated attribute to be generated based on two or more other attributes.

6. The adaptable data warehousing computing system of claim 1, wherein the DSL is configured to specify a timeline in conceptual data model, and
wherein generator software component further comprises computer-executable instructions, that, when executed by one or more processors, cause the one or more processors to:
create, based on the timeline, an extraction, transformation and loading (ETL) process that, when executed by the one or more processors, implements a sequence of time-based or hierarchical-based loading of one or more sources or source columns of the logical data layer or the physical data model, the one or more sources or source columns selected based on the one or more attributes of the conceptual data model.

7. The adaptable data warehousing computing system of claim 1, wherein a current state of the conceptual data model is stored in a working repository on the one or more computer memories,
wherein the target database is one of a plurality of deployment environments, and
wherein the generator software component further comprises computer-executable instructions, that, when executed by one or more processors, cause the one or more processors to:
deploy the current state of the conceptual data model to one or more of the plurality of deployment environments, the deployment causing generation of respective logical data models and physical data models to update the target database at each respective deployment environment.

8. The adaptable data warehousing computing system of claim 1, wherein the one or more processors implements the set of logical layer rules to translate the conceptual model into the logical data model based on a specified data modeling algorithm.

9. The adaptable data warehousing computing system of claim 1, wherein the declarative command, in the programmatic syntax of the DSL, is exported to an executable DSL file, wherein the executable DSL file is configured to be executed, by the one or more processors, to implement the declarative command at a later time.

10. The adaptable data warehousing computing system of claim 1, wherein the conceptual data model is configured to be rendered on a display as a graph model or tree model.

11. The adaptable data warehousing computing system of claim 10, wherein the conceptual data model is able to be rendered on the display prior to generating at least one of the logical data model or the physical data model.

12. An adaptable data warehousing computing method for programmatic modeling and database building, the adaptable data warehousing computing method comprising:
inputting a declarative command having a programmatic syntax in a domain specific language (DSL), wherein the DSL is configured to define one or more declarative computing commands executable by a declarative scripting engine stored on one or more computer memories and accessible by one or more processors, wherein the DSL is modifiable to programmatically configure a conceptual data model, wherein the conceptual data model defines one or more business objects, and, wherein the declarative command defines the one or more business objects of the conceptual data model, each business object having one or more attributes and/or defining one or more relationships between one or more other business objects;
generating, based on the declarative command and a set of logical layer rules, a logical data model, the logical data model defining one or more logical layers comprising: a stage layer, a core layer, and/or a data mart layer;
generating, based on the logical data model and one or more database-specific templates, one or more database objects; and
updating, based on the one or more database objects of the logical data model by the one or more processors, a target database to define a physical data model, the physical data model defining physical data model layers derived from a same type of layer as selected from the one or more logical layers.

13. The adaptable data warehousing computing method of claim 12, wherein the declarative command having a programmatic syntax in the DSL is annotated with metadata.

14. The adaptable data warehousing computing method of claim 12, wherein the declarative command is generated based on input from a graphic user interface.

15. The adaptable data warehousing computing method of claim 12, wherein generator software component further comprises computer-executable instructions, that, when executed by one or more processors, cause the one or more processors to:
input a second declarative command having a programmatic syntax in the DSL, wherein the second declarative command is configured to initiate an alteration of the one or more business objects, wherein the alteration causes the one or more processors to:

generate, based on the second declarative command and a set of logical layer rules, one or more second logical data models, each second logical data model defining one of: the stage layer, the core layer, and/or the data mart layer, generate, based on the second logical data models and one or more database-specific templates, one or more second database objects, and update the target database to define one or more second physical data models based on the one or more second database objects, each second physical data model derived from a same type of logical data model as selected from the one or more second logical data models.

16. The adaptable data warehousing computing method of claim 12, wherein at least one of the one or more attributes comprises a calculated attribute, the calculated attributed defined by the DSL and configured to cause the calculated attribute to be generated based on two or more other attributes.

17. The adaptable data warehousing computing method of claim 12, wherein the DSL is configured to specify a timeline in conceptual data model, and wherein generator software component further comprises computer-executable instructions, that, when executed by one or more processors, cause the one or more processors to:

create, based on the timeline, an extraction, transformation and loading (ETL) process that, when executed by the one or more processors, implements a sequence of time-based or hierarchical-based loading of one or more sources or source columns of the logical data layer or the physical data model, the one or more sources or source columns selected based on the one or more attributes of the conceptual data model.

18. The adaptable data warehousing computing method of claim 12, wherein a current state of the conceptual data model is stored in a working repository on the one or more computer memories, wherein the target database is one of a plurality of deployment environments, and wherein the adaptable data warehousing computing method further comprises:

deploying the current state of the conceptual data model to one or more of the plurality of deployment environments, the deployment causing generation of respective logical data models and physical data models to update the target database at each respective deployment environment.

19. The adaptable data warehousing computing method of claim 12, wherein the one or more processors implements the set of logical layer rules to translate the conceptual model into the logical data model based on a specified data modeling algorithm.

20. The adaptable data warehousing computing method of claim 12, wherein the declarative command, in the programmatic syntax of the DSL, is exported to an executable DSL file, wherein the executable DSL file is configured to be executed, by the one or more processors, to implement the declarative command at a later time.

21. The adaptable data warehousing computing method of claim 12, wherein the conceptual data model is configured to be rendered on a display as a graph model or tree model.

22. The adaptable data warehousing computing method of claim 21, wherein the conceptual data model is able to be rendered on the display prior to generating at least one of the logical data model or the physical data model.

23. A tangible, non-transitory computer-readable medium storing instructions for optimizing search engine results, that when executed by one or more processors cause the one or more processors to:

input a declarative command having a programmatic syntax in a domain specific language (DSL), wherein the DSL is configured to define one or more declarative computing commands executable by a declarative scripting engine stored on one or more computer memories and accessible by one or more processors, wherein the DSL is modifiable to programmatically configure a conceptual data model, wherein the conceptual data model defines one or more business objects, and, wherein the declarative command defines the one or more business objects of the conceptual data model, each business object having one or more attributes and/or defining one or more relationships between one or more other business objects, generate, based on the declarative command and a set of logical layer rules, a logical data model, the logical data model defining one or more logical layers comprising: a stage layer, a core layer, and/or a data mart layer, generate, based on the logical data model and one or more database-specific templates, one or more database objects, and update, based on the one or more database objects of the logical data model by the one or more processors, a target database to define a physical data model, the physical data model defining physical data model layers derived from a same type of layer as selected from the one or more logical layers.

* * * * *